(12) United States Patent
Ueno

(10) Patent No.: US 7,024,411 B2
(45) Date of Patent: Apr. 4, 2006

(54) METHOD, SYSTEM AND COMPUTER PROGRAM PRODUCT FOR PROVIDING BACKUP DATA FOR USE IN STUDYING CLAIMS

(75) Inventor: Toshio Ueno, Hanno (JP)

(73) Assignees: Toshiba Tec Kabushiki Kaisha, Tokyo (JP); Kabushiki Kaisha Toshiba, Tokyo (JP)

( * ) Notice: Subject to any disclaimer, the term of this patent is extended or adjusted under 35 U.S.C. 154(b) by 421 days.

(21) Appl. No.: 10/002,771

(22) Filed: Nov. 2, 2001

(65) Prior Publication Data

US 2003/0088590 A1    May 8, 2003

(51) Int. Cl.
*G06F 17/30* (2006.01)
(52) U.S. Cl. ............... 707/10; 707/6; 707/102; 707/104.1; 707/203; 707/204
(58) Field of Classification Search ............ 707/102, 707/104, 201, 202, 203, 204, 10, 8, 2, 6, 707/104.1; 710/65; 711/162; 709/200
See application file for complete search history.

(56) References Cited

U.S. PATENT DOCUMENTS

| | | | |
|---|---|---|---|
| 5,197,005 A | 3/1993 | Shwartz et al | |
| 5,287,505 A | 2/1994 | Calvert et al | |
| 5,365,310 A | 11/1994 | Jenkins et al. | |
| 5,446,883 A | 8/1995 | Kirkbride et al | |
| 5,459,552 A | 10/1995 | Ohira | |
| 5,819,110 A | 10/1998 | Motoyama | |
| 5,819,272 A * | 10/1998 | Benson ........................... | 707/8 |
| 5,964,891 A | 10/1999 | Caswell et al | |
| 6,032,184 A | 2/2000 | Cogger et al | |
| 6,073,161 A * | 6/2000 | DeBoskey et al. .......... | 709/200 |
| 6,219,648 B1 | 4/2001 | Jones et al | |
| 6,289,333 B1 * | 9/2001 | Jawahar et al. ............... | 707/2 |
| 6,389,426 B1 | 5/2002 | Turnbull et al | |
| 6,463,437 B1 | 10/2002 | Mongilio | |
| 6,467,088 B1 | 10/2002 | AlSafadi et al | |
| 6,487,560 B1 * | 11/2002 | LaRue et al. ............... | 707/203 |
| 6,513,052 B1 * | 1/2003 | Binder ....................... | 707/204 |
| 6,539,419 B1 | 3/2003 | Beck et al | |
| 6,678,764 B1 * | 1/2004 | Parvulescu et al. ........... | 710/65 |
| 6,694,335 B1 * | 2/2004 | Hopmann et al. .......... | 707/201 |
| 6,735,592 B1 | 5/2004 | Neumann et al | |
| 6,766,320 B1 | 7/2004 | Wang et al | |
| 6,802,042 B1 | 10/2004 | Rangan et al | |
| 6,836,830 B1 * | 12/2004 | Yamagami et al. ......... | 711/162 |

(Continued)

FOREIGN PATENT DOCUMENTS

DE    100 29 455 A1    7/2001

(Continued)

OTHER PUBLICATIONS

U.S. Appl. No. 09/813,209, filed Mar. 20, 2001, entitled Technical Support System, inventor : Mineo Nozaki and Toshio Ueno.

(Continued)

*Primary Examiner*—Thuy N. Pardo
(74) *Attorney, Agent, or Firm*—Frishauf, Holtz, Goodman & Chick, P.C.

(57) ABSTRACT

A method for providing backup data utilizing a remote maintenance system acquires claim information and generates a necessary backup data item from the claim information. Further, it accesses a product of a user through a network and acquires information corresponding to the backup data item from the product of the user.

16 Claims, 2 Drawing Sheets

| Claim type \ Backup data | Number of copies | Number of copies in each paper feed stage | Image concentration set value | Exposure set value | ...... |
|---|---|---|---|---|---|
| A | ○ | ○ | | | |
| B | | ○ | ○ | | |
| C | ○ | ○ | | ○ | |
| ⋮ | | | | | |

31

U.S. PATENT DOCUMENTS

| | | | |
|---|---|---|---|
| 2001/0013063 A1 | 8/2001 | Hall et al | |
| 2001/0032210 A1* | 10/2001 | Frank et al. | 707/104.1 |
| 2001/0051952 A1* | 12/2001 | Nakazato | 707/104.1 |
| 2002/0032672 A1 | 3/2002 | Keith, Jr. | |
| 2002/0059369 A1 | 5/2002 | Kern et al | |
| 2002/0120684 A1 | 8/2002 | Christfort et al | |
| 2002/0129047 A1* | 9/2002 | Cane et al. | 707/204 |
| 2002/0133509 A1* | 9/2002 | Johnston et al. | 707/203 |
| 2002/0156692 A1 | 10/2002 | Squeglia et al | |

FOREIGN PATENT DOCUMENTS

| | | |
|---|---|---|
| DE | 101 05 532 A1 | 8/2001 |
| EP | 0 822 473 A2 | 2/1998 |
| EP | 0 843 229 A2 | 5/1998 |
| EP | 1 182 857 A2 | 2/2002 |
| JP | 8-44700 A | 2/1996 |
| JP | 11-232327 A | 8/1999 |
| JP | 11-250130 A | 9/1999 |
| JP | 2000-115393 A | 4/2000 |
| JP | 2000-155778 A | 6/2000 |
| JP | 2000-215204 A | 8/2000 |
| JP | 2000-305872 A | 11/2000 |
| JP | 2001-084276 A | 3/2001 |
| JP | 2001-160103 A | 6/2001 |
| WO | WO 01/02954 A1 | 1/2001 |

OTHER PUBLICATIONS

Hilbert, David M., et al., "An Approach to Large-Scale Collection of Application Usage Data Over the Internet" Proceeding of the 20th International Conference on Software Engineering, Apr. 1998, ISBN 0-8186-8368-6, pp. 136-142.

U.S. Appl. No. 10/002,740, filed Nov. 2, 2002, entitled System, Method and Computer Program for Rank Assignment, inventer: Toshio Ueno.

U.S. Appl. No. 10/002,742, filed Nov. 2, 2002, entitled System, Method and Computer Program Product for Complaint Report Issue, inventor: Toshio Ueno.

U.S. Appl. No. 10/002,743, filed Nov. 2, 2002, entitled Technical Support System, inventor: Toshio Ueno.

U.S. Appl. No. 10/002,774, filed Nov. 2, 2002, entitled Technical Support System, inventor: Toshio Ueno.

U.S. Appl. No. 10/002,745, filed Nov. 2, 2002, entitled Technical Support System, inventor: Toshio Ueno.

U.S. Appl. No. 10/002,772, filed Nov. 2, 2002, entitled Method, System and Computer Program Product for Coping with the Changes in Hardware, inventor: Toshio Ueno.

* cited by examiner

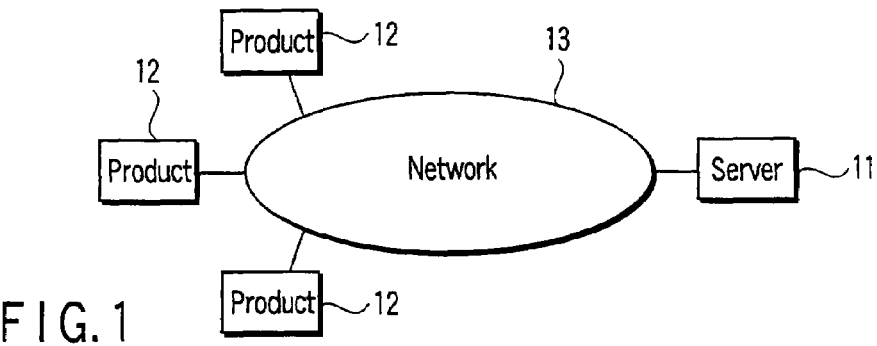
FIG. 1
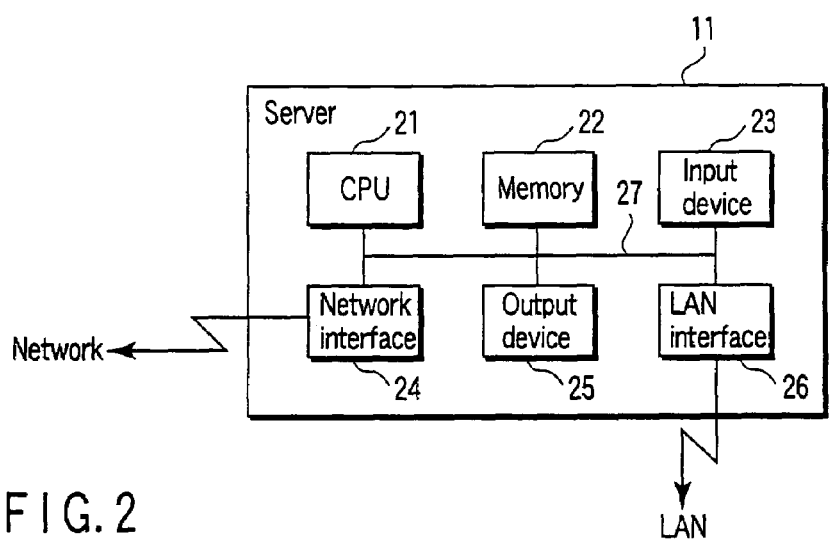
FIG. 2
| Claim type \ Backup data | Number of copies | Number of copies in each paper feed stage | Image concentration set value | Exposure set value | ...... |
|---|---|---|---|---|---|
| A | ○ | ○ | | | |
| B | | ○ | ○ | | |
| C | ○ | ○ | | ○ | |
| ⋮ | | | | | |
FIG. 4

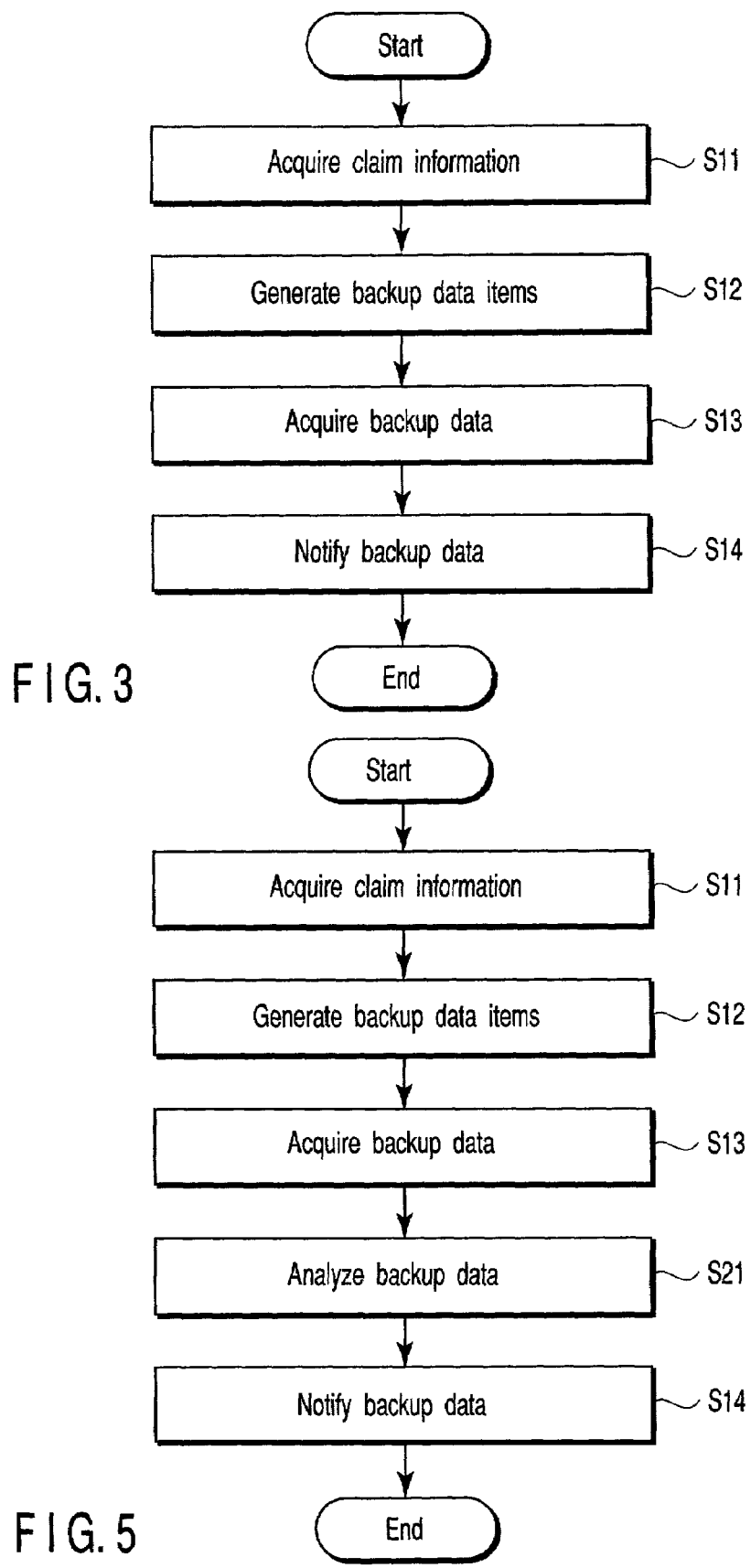

METHOD, SYSTEM AND COMPUTER PROGRAM PRODUCT FOR PROVIDING BACKUP DATA FOR USE IN STUDYING CLAIMS

BACKGROUND OF THE INVENTION

1. Field of the Invention

A method, system and computer program product for providing backup data for use in a work of studying a measure against claims using a remote maintenance system.

2. Description of the Related Art

To improve the efficiency of maintenance services, a remote maintenance system has been constructed, in which a user's product and a server of a maintenance center are connected via a network and the user's product is subjected to suitable maintenance by remote control from the maintenance center.

In such a system, a user's product to be subjected to maintenance incorporates a communication device such as a modem, and the user's product and a server of a maintenance center are connected through a network, for example, the Internet or a private line.

When trouble occurs in the user's product, a maintenance request (claim) is reported to a section which considers solutions of claims, for example, a claim countermeasure department, to eliminate the trouble, and a solution of the claim is studied. In the study, not only the state of trouble, but also various usage (backup) data representing the usage state and usage condition of the product, in which the trouble occurs, are required.

However, in general, since the report to the claim countermeasure department is not sufficient for backup data necessary to study a solution, necessary backup data must be additionally collected. Moreover, if backup data of the same model of another user, which does not malfunction but normally functions, is used in the study, a more reliable solution can be worked out.

Therefore, there is a need for a method and system, in which, when a claim is reported, contents of the claim are checked and necessary items as backup data are chosen, and a user's product is accessed by means of a network or a remote maintenance system, thereby acquiring necessary backup data.

There is also a need for a method and system, which analyze the attained backup data.

BRIEF SUMMARY OF THE INVENTION

According to an aspect of the present invention, a method for providing backup data utilizing a remote maintenance system acquires claim information and generates a necessary backup data item from the claim information. Further, it accesses a product of a user through a network and acquires information corresponding to the backup data item from the product of the user.

BRIEF DESCRIPTION OF THE SEVERAL VIEWS OF THE DRAWING

The accompanying drawings, which are incorporated in and comprise a part of the specification, illustrate presently embodiments of the invention, and together with the general description given above and detailed description of the embodiments given below, serve to explain the principles of the invention.

FIG. 1 is a block diagram for explaining the overall configuration of a remote maintenance system according to a first embodiment of the present invention;

FIG. 2 is a structural diagram of a server used in the embodiment;

FIG. 3 is a flowchart showing an operation of supporting a change in hardware in the first embodiment;

FIG. 4 shows an example of a backup data item table; and

FIG. 5 is a flowchart showing an operation of supporting a change in hardware in a second embodiment.

DETAILED DESCRIPTION OF THE INVENTION

Embodiments of the present invention will now be described with reference to the drawings.

(First Embodiment)

FIG. 1 is a block diagram for explaining the overall configuration of a remote maintenance system according to a first embodiment of the present invention. A server 11 of a maintenance center, which exercises control over product maintenance, is connected to each product 12 used by users via a network 13. The network 13 may be a private line managed by the maintenance center and only used by subscribed users. Alternatively, it may be a line that can be used by anybody, such as the Internet.

FIG. 2 is a structural diagram of a server 11 used in the embodiment. The server 11 comprises a CPU 21, a memory 22, an input device 23, a network interface 24, an output device 25, an intracompany LAN interface 26 and a system bus 27.

The memory 22 is a flash memory card including a flash memory card drive, a hard disk including a hard disk drive, a ROM, a RAM, or the like. The input device 23 is a keyboard, a mouse, or the like. The network interface 24 is connected to the network server 13, such as the Internet or the private line, i.e., a communication path to the outside of the server 11. The output device 25 is a display or the like. The intracompany LAN interface 26 is connected to another system or a printer in the maintenance center which uses the server 11, or an external system which uses information collected by the server 11. These are connected to one another by the system bus 27.

FIG. 3 is a flowchart showing an operation of providing backup data utilizing a remote maintenance system in the first embodiment. It is premised that the product of the user incorporates a communication device such as a modem, and is connected to the server 11 of the maintenance center via the network 13, such as the Internet or a private line.

Further, the memory 22 of the server 11 prestores a backup data item table 31. The backup data items are information items necessary for studying measures to resolve claims. For example, if the product which is the object of a claim is a copying machine, the following are representative backup data items: the number of copies; the number of copies in each paper feed stage; the image concentration measurement value; the exposure set value; the automatic concentration adjustment set value; the drum charge adjustment set value; the network environment, etc. The backup data table shows in a matrix what items of the backup data is necessary for a content of the claim.

FIG. 4 shows an example of a backup data item table 31. In this example, the product which is the object of claim is a copying machine. The claim types A, B, C, . . . are arranged in the column direction. The backup data items of the number of copies, the number of copies in each paper feed stage, the image concentration set value, the exposure set value, ... are arranged in the row direction. In the claim type A, the number of copies and the number of copies in each paper feed stage of the backup data items are marked with circles. This indicates that two backup data items of the number of copies and the number of copies in each paper feed stage are necessary for the claim type A.

In a step S11, the server 11 acquires claim information through the intracompany LAN interface 26. The claim information includes contents of the claim, i.e., the state of trouble, the model of the product which is the object of claim, etc. The server 11 may acquire the information as data through the intracompany LAN interface 26, or acquire it as data through the network 13 via the network interface 24 from the outside of the server 11. Alternatively, the server 11 may acquire the information by input of claim information through the input device 23 into the server 11.

In a step S12, the server 11 generates backup data items from the acquired claim information. The CPU 21 of the server 11 reads the backup data item table 31 from the memory 22, and performs matching with the acquired claim information. If the acquired claim information includes claim type information, a backup data item can be generated by specifying the backup data item based on the corresponding claim type in the backup data item table 31. If the acquired claim information does not include claim type information, the CPU 21 of the server 11 may have a structure of analyzing the contents of the claim and choosing a suitable claim type from the table 31.

In a step S13, the server 11 accesses the product 12 of the user from the network interface 24 through the network 13, and acquires backup data from the product of the user. The backup data can be acquired from: 1. the product of the user which is the object of claim; 2. a product of another user of the same model as that of the object of claim; and both 1 and 2. The case 1 is a case where it is necessary to acquire the backup data from the product which is the object of claim itself included in the claim information. On the other hand, the case 2 is a case where it is necessary to acquire the backup data of another user, functioning normally, of the same model as that of the product which is the object of claim. By comparing the backup data of the product in which trouble occurs and the backup data of the normally functioning product, a measure against the claim can be worked out immediately, and an accurate measure can be obtained.

In a step S14, the information corresponding to the backup data items acquired by the step 13 is notified to the equipment owned by the person in charge of measures against claims. The information is notified as data to the equipment owned by the person in charge of the measures against claims through the intracompany LAN interface 26 of the server 11. It may be notified to the outside from the server 11 through the network 13 via the network interface 24. Alternatively, the information may be output through the output device 25 of the server 11, so that it can be notified to the claim countermeasure department by facsimile or mail.

(Second Embodiment)

This embodiment is a modification of the first embodiment. FIG. 5 is a flowchart showing an operation of providing backup data utilizing a remote maintenance system of this embodiment. The preconditions of the first embodiment also apply to this embodiment. The same symbols as those used in FIG. 3 are assigned to the portions in common with the first embodiment. Detailed descriptions of the step S11 to the step S14, in common with the first embodiment, will be omitted. This embodiment is different from the first embodiment in that a step S21 is inserted between the step S13 and the step S14.

After the step S13, in the step S21, the backup data acquired in the step S13 is analyzed. The information to be analyzed is the information acquired from the product of another user of the same model as that of the product which is the object of claim. Data is analyzed item by item of the backup data based on the information. For example, if the item of the backup data is the number of copies, the number of copies in the acquired information is collected and the average number of copies of all products is calculated, or the maximum number of copies or the minimum number of copies is extracted. By comparing the analyzed data and the backup data of the product in which the trouble occurs, the usage state of the product in which the trouble occurs can be compared with that of the normally functioning product.

After the step S21, the step S14 follows.

FIGS. 3 and 5 are flowcharts of the method and the system according to the embodiments of the invention. Each block of the flowchart and combinations of blocks in the flowcharts can be implemented by computer program instructions. These computer program instructions may be loaded onto a computer or other programmable apparatus to produce a machine. These computer program instructions may also be stored in a computer-readable memory which can direct a computer or other programmable apparatus to function in a particular manner. The computer program instructions may also be loaded onto a computer or other programmable apparatus to cause a series of operational steps to be performed on the computer or other programmable apparatus to produce a computer implemented process.

An optical disk such as a CD-ROM, a magneto-optical disk such as an MO, or a semiconductor memory may be a concrete example of the computer-readable memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A computer-implemented method for providing usage data utilizing a remote maintenance system, said method comprising:
    acquiring claim information from an apparatus of a first user in which an error has occurred, the apparatus having a copying function;
    identifying at least one necessary usage data item based on a claim type corresponding to the claim information;
    accessing through a network the apparatus of the first user and an apparatus of a second user, wherein the apparatus of the first user and the apparatus of the second user are of a same model;
    acquiring usage data information corresponding to the identified usage data item from the apparatus of the first user and from the apparatus of the second user; and
    comparing the usage data information acquired from the apparatus of the first user with the usage data information acquired from the apparatus of the second user, analyzing both said acquired usage data information, and determining a solution for the claim.

2. The method according to claim 1, further comprising providing the acquired usage data information to a terminal operated by a maintenance administrator.

3. The method according to claim 1, further comprising, analyzing the usage data information acquired from the apparatus of the second user and generating an average value of each usage data item.

4. The method according to claim 1, wherein the usage data item includes a number of copies.

5. The method according to claim 1 wherein the usage data item includes a number of copies in each paper feed stage of the apparatuses.

6. The method according to claim 1 wherein the usage data item includes an image concentration measurement value of the apparatuses.

7. The method according to claim 1 wherein the usage data item includes an exposure set value of the apparatuses.

8. The method according to claim 1, wherein the usage data item includes an automatic concentration adjustment set value of the apparatuses.

9. The method according to claim 1, wherein the usage data item includes a drum charge adjustment set value of the apparatuses.

10. The method according to claim 1, wherein the usage data item includes a network environment of the apparatuses.

11. A computer-implemented system for providing usage data utilizing a remote maintenance system, said system for providing usage data comprising:
a claim information acquiring section which acquires claim information from an apparatus of a first user in which an error has occurred, the apparatus having a copying function;
an item identifying section which identifies at least one necessary usage data item based on a claim type corresponding to the claim information;
an information acquiring section which: (i) accesses through a network the apparatus of the first user and an apparatus of a second user, wherein the apparatus of the first user and the apparatus of the second user are of a same model, and (ii) acquires usage data information corresponding to the usage data item from the apparatus of the first user and from the apparatus of the second user; and
a determining section which compares the usage data information acquired from the apparatus of the first user with the usage data information acquired from the apparatus of the second user, analyzes both said acquired usage data information, and determines a solution for the claim.

12. The system according to claim 11, further comprising a providing section which provides the acquired usage data information to a terminal operated by a maintenance administrator.

13. The system according to claim 11, further comprising an average generating section which analyzes the usage data information acquired from the apparatus of the second user and generates an average value of each usage data item.

14. A computer-readable storage medium having computer-readable program code stored thereon for causing a computer to provide usage data utilizing a remote maintenance system, said computer-readable program code comprising:
computer readable program code for causing the computer to acquire claim information from an apparatus of a first user in which an error has occurred, the apparatus having a copying function;
computer readable program code for causing the computer to identify at least one necessary usage data item based on a claim type corresponding to the claim information;
computer readable program code for causing the computer to access through a network the apparatus of the first user and an apparatus of a second user, wherein the apparatus of the first user and the apparatus of the second user are of a same model;
computer readable program code for causing the computer to acquire usage data information corresponding to the usage data item from the apparatus of the first user and from the apparatus of the second user; and
computer readable program code for causing the computer to compare the usage data information acquired from the apparatus of the first user with the usage data information acquired from the apparatus of the second user, analyze both said acquired usage data information, and determine a measure against the claim.

15. The computer-readable storage medium according to claim 14 further comprising computer readable program code for causing the computer to provide the acquired usage data information to a terminal operated by a maintenance administrator.

16. The computer-readable storage medium according to claim 14, further comprising computer readable program code for causing the computer to analyze the usage data information acquired from the apparatus of the second user and generate an average value of each usage data item.

* * * * *